(12) United States Patent
Lin et al.

(10) Patent No.: US 7,549,000 B2
(45) Date of Patent: Jun. 16, 2009

(54) APPARATUS AND METHOD FOR GENERATING BITSTREAM OF S/PDIF DATA IN HDMI

(75) Inventors: Tzuo-bo Lin, Taipei (TW); Hsu-Jung Tung, Kao-Hsiung (TW); Sheng-Nan Chiou, Chang-Hua (TW); Chia-Sheng Tsai, Tai-Chung (TW)

(73) Assignee: Realtek Semiconductor Corp., HsinChu (TW)

( * ) Notice: Subject to any disclaimer, the term of this patent is extended or adjusted under 35 U.S.C. 154(b) by 219 days.

(21) Appl. No.: 11/306,703

(22) Filed: Jan. 9, 2006

(65) Prior Publication Data
US 2007/0174523 A1   Jul. 26, 2007

(51) Int. Cl.
*G06F 13/12* (2006.01)
*G06F 13/38* (2006.01)
(52) U.S. Cl. .......................... 710/65; 725/80; 375/240
(58) Field of Classification Search .............. 710/65; 375/240; 725/80
See application file for complete search history.

(56) References Cited

U.S. PATENT DOCUMENTS

| | | | |
|---|---|---|---|
| 6,647,061 B1 * | 11/2003 | Panusopone et al. | 375/240.12 |
| 6,914,637 B1 * | 7/2005 | Wolf et al. | 348/473 |
| 2005/0280742 A1 * | 12/2005 | Jaffe | 348/726 |
| 2007/0143801 A1 * | 6/2007 | Madonna et al. | 725/80 |

\* cited by examiner

*Primary Examiner*—Alford W Kindred
*Assistant Examiner*—Chun-Kuan Lee
(74) *Attorney, Agent, or Firm*—Winston Hsu

(57) ABSTRACT

An apparatus and method for regenerating S/PDIF data is disclosed. The apparatus includes a buffer for buffering sample words of the data units; a decision unit for receiving control words of the data units and outputting a selected control word according to a current control word of a current data unit and a previous control word of a previous data unit; and a transmitter for generating the bitstream of the first digital interconnect format according to the sample words of the data units and the selected control words outputted from the decision unit.

15 Claims, 2 Drawing Sheets

APPARATUS AND METHOD FOR GENERATING BITSTREAM OF S/PDIF DATA IN HDMI

BACKGROUND OF THE INVENTION

1. Field of the Invention

The invention relates to an apparatus for generating a bitstream, and more particularly, to an apparatus for generating a bitstream utilizing a decision unit and a method thereof.

2. Description of the Prior Art

Sony/Philips Digital Interface Format (S/PDIF), also known as IEC 958 type II, is a data format for carrying pulse code modulated (PCM) digital audio signals between devices and stereo components. It is most commonly used in CD and DVD players. S/PDIF data utilizes bi-phase mark or 'Manchester' coding, which is DC free, self-clocking and capable of working with a changing sampling rate.

Please refer to FIG. 1. FIG. 1 is a diagram of a format of S/PDIF data according to the prior art. The data is divided into two sub-frames corresponding to a left and a right channel respectively. Each sub-frame consists of 32 bits. S/PDIF can be described as comprising sample words, i.e. data; and control words, which are the preamble and the status bits. The first 4 bits of the sub-frame (bits 0 to 3) are the preamble, used for synchronization. There are 3 different preamble/sync-patterns B, M, and W utilized in the S/PDIF format. Preamble B marks a word containing data for channel A (left) at the start of a block. Preamble M marks a word with data for channel A that is not at the start of a block. Preamble W marks a word containing data for channel B (right, for stereo).

Bits 4 to 28 are the audio sample. Bits that are not used are defined to be zero in S/PDIF. Four status bits (bits 28 to 31) accompany each sub-frame. Bit 28 (V) is the validity flag, which indicates whether the data received is suitable for conversion to an analog signal. Bit 29 is the user check. Bit 30 is the channel status. Bit 31 is the parity bit (P), which is meant for error correction at the destination, by ensuring the number of '1's and '0's are even. The validity flag, user bit (U) and channel status (C) are collected to form validity, user and channel status blocks. S/PDIF data is transmitted in blocks of 192 frames, where the preamble B is used to denote the start of a block, i.e. frame 1.

Conventional apparatus for regenerating S/PDIF data extract a sample word and a control word of the data and send them to a FIFO buffer, which is clocked by a pixel clock and an audio clock. The sample word and control word are then sent to a transmitter (data format converter), which reconstructs the data, captures the channel status, and carries out a parity check.

In the related art, however, the audio clock sometimes is not transmitted directly to the receiver for decoding the data, but is obtained from the other related clock information as a ratio of one clock to the other, and can therefore have related noise. If noise exists in the audio stream it will cause some '0's to be erroneously converted to '1's and vice versa. This means the audio clock cannot be properly locked to the data, causing the data to be distorted, or even preventing the system from playing the data.

SUMMARY OF THE INVENTION

It is therefore an objective of the present invention to provide an apparatus and a method for generating a bitstream, to solve the above-mentioned problem.

Briefly described, an apparatus for generating a bitstream of a first digital interconnect format according to incoming digital data corresponding to a second digital interconnect format is disclosed. The incoming digital data comprise a plurality of data units each having at least a sample word and a control word. The apparatus comprises a buffer for buffering sample words of the data units; a decision unit for receiving control words of the data units and outputting a selected control word according to a current control word of a current data unit and a previous control word of a previous data unit; and a transmitter for generating the bitstream of the first digital interconnect format according to the sample words of the data units and the selected control words outputted from the decision unit.

In addition, a method for generating a bitstream of a first digital interconnect format according to incoming digital data corresponding to a second digital interconnect format is disclosed. The incoming digital data comprise a plurality of data units each having at least a sample word and a control word. The method comprises: buffering sample words of the data units; receiving and storing a previous control word into a storage unit; receiving a current control word of the data unit and selectively outputting one of the previous control word and the current control word; determining whether the previous control word in the storage unit is replaced by the current control word according to the at least one previous control word and the current control word; and generating a bitstream of the first digital interconnect format according to the outputted sample words of the data units and the selected control words.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
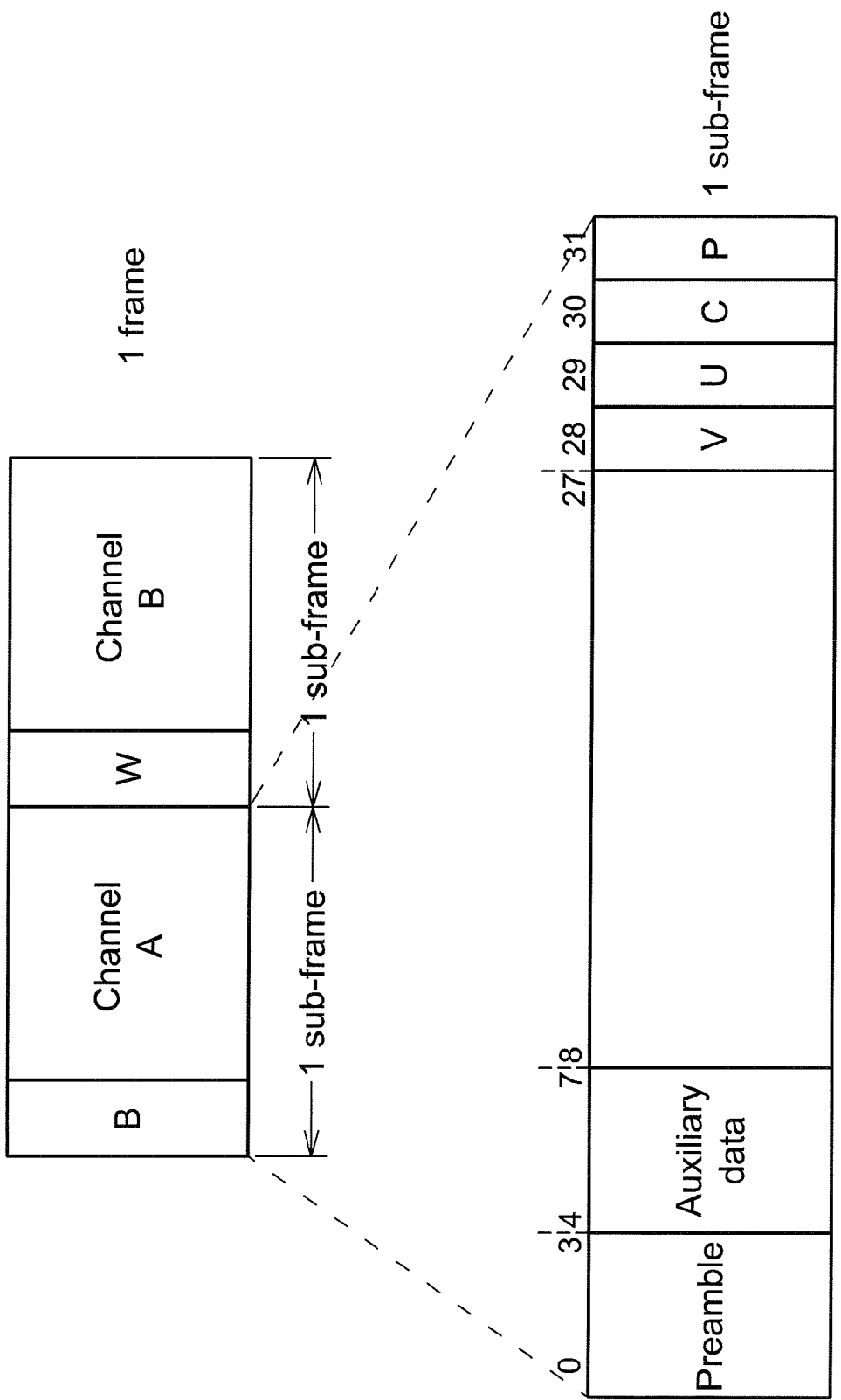
FIG. 1 is a diagram of a frame of S/PDIF data according to the prior art.
Figure 2:
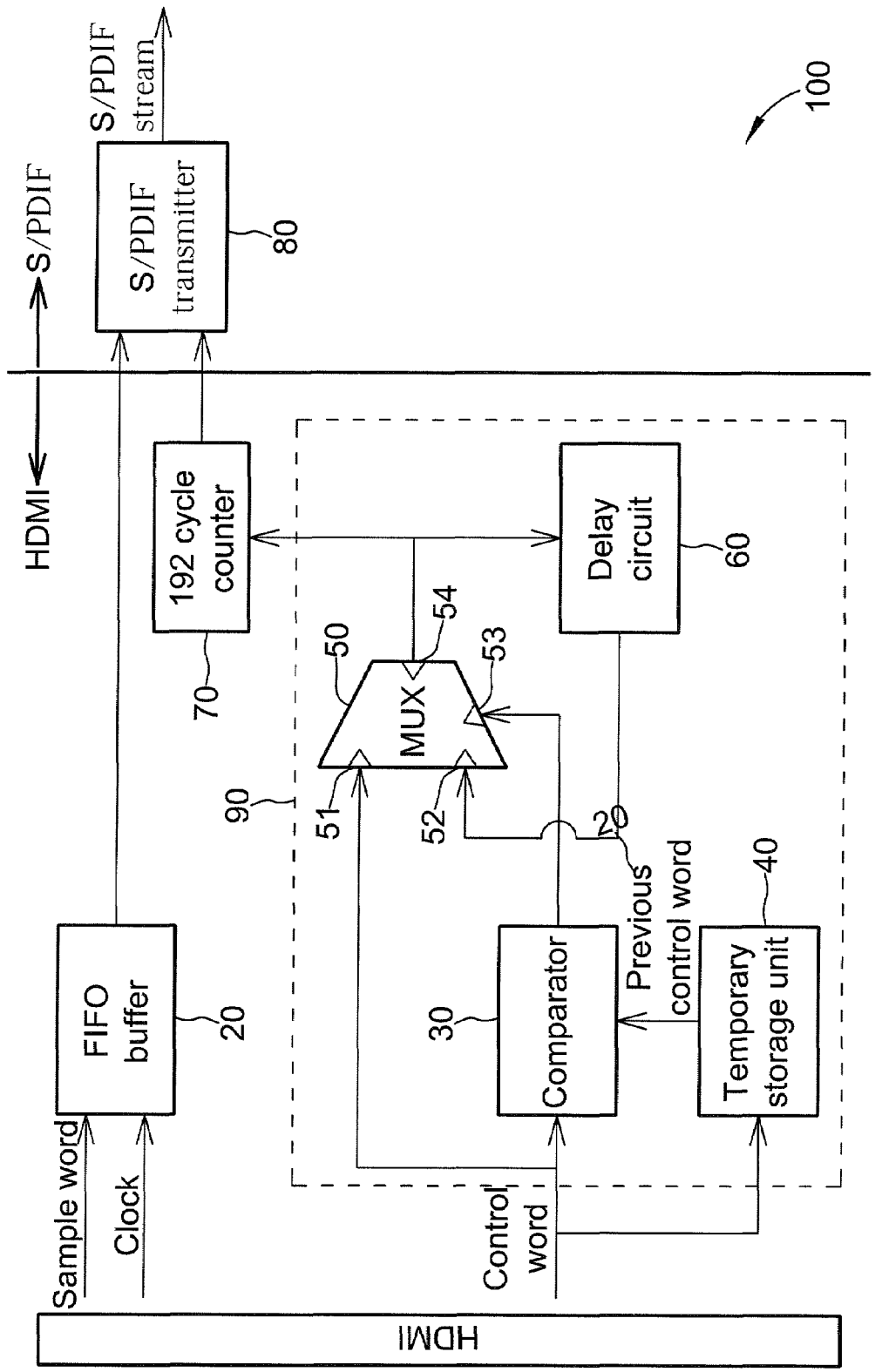
FIG. 2 is a diagram of an apparatus for generating S/PDIF data according to an embodiment of the present invention.

Please note that the following description is merely one embodiment of the invention and is not a limitation of the invention. Please refer to FIG. 2. FIG. 2 is a diagram of an apparatus 100 for generating S/PDIF data according to an embodiment of the present invention. The process can be carried out in an HDMI interface, which negates the need for converting from digital data to audio and then back to digital again. In other words, the apparatus 100 is implemented in the HDMI interface circuitry. It is well known that the HDMI interface allows video and audio data to be transmitted together. A FIFO 20 clocked by a pixel clock CLK buffers sample words of S/PDIF data. Control words of the S/PDIF data, comprising aforementioned validity flags, user status, and channel status are sent to three decision units respectively. Please note that the validity flag and user data are transmitted in 1-bit blocks, but the channel status is transmitted as a 192-bit block. Although 384 sub-frames will be transmitted in a block and each sub-frame contains one channel status bit, the channel status bit is mostly equal for each pair of sub-frames so only 192 bits of channel status data is transmitted. Similarly, only 1 bit of validity flag and user data respectively will be transmitted in a frame. The skilled person can easily understand operations of other decision units applying to validity flag and user data after reading the following description related to operation of the channel status decision unit 90. For simplicity, only the channel status decision unit 90 is shown in FIG. 2, and the invention will herein be detailed with reference to the channel status decision unit 90 only.

In this embodiment, the channel status decision unit 90 comprises a comparator 30, a temporary storage unit 40, a channel status multiplexer (MUX) 50, and a delay circuit 60. The comparator 30 receives a current 192-bit channel status block of data and compares it with a previous 192-bit channel status block, which has been stored in the temporary storage unit 40. As mentioned before, noise in the preamble can cause 0's to be changed to 1's and vice versa, distorting the data. If the current and the previous channel status blocks are the same, therefore, it can be seen that noise does not exist in this block. If the current 192-bit channel status block and the previous 192-bit channel status block are the same, the comparator 30 will output a logic "1". If the current 192-bit channel status block and the previous 192-bit channel status block are different, the comparator 30 will output a logic "0".

This logic is then input to the channel status MUX 50. The operations of (respectively) the validity flag decision unit and user status decision unit are largely the same as the channel status decision unit, except that the validity flag decision unit and user status decision unit both contain temporary storage units having a 1-bit memory, as both the validity flag and user status control words are transmitted in blocks of 1 bit.

The channel status MUX 50 has a first data input port 51 for receiving a current 192-bit channel status, a second data input port 52 for receiving a previous 192-bit channel status output, and a control port 53 for receiving the comparison result (logic "0" or logic "1") from the comparator 30. A data output port 54 outputs the selected 192-bit channel status. If the multiplexer receives a logic "1" (meaning the current channel status and the previous channel status are the same) it will output the current 192-bit channel status block; if the multiplexer receives a logic "0" (meaning the current channel status and the previous channel status are different) it will output the previous 192-bit channel status output. The outputted 192-bit channel status block is sent to a 192 cycle counter 70, and the delay circuit 60. The delay circuit 60 stores the 192-bit channel status and inputs it back to the second data input port 52 as the previous 192-bit channel output. In an event where no previous channel status exists, i.e. the first 192-channel status block in the bitstream, it will be taken to be correct and outputted. The second 192-bit channel status block of the stream of data is then compared with the first 192-bit channel status block.

Please note that the components of the channel status decision unit 90 described herein are merely one embodiment and are not a limitation of the present invention. It is clear that the decision unit 90 can be implemented by other components that have the same function of comparing a current control word with a previous control word and selectively outputting one of the two. In addition, the outputted logic levels are defined according to the overall circuit design. For example, in another embodiment, the comparator 30 outputs a logic "0" as the current 192-bit channel status block and the previous 192-bit channel status block are the same, and outputs a logic "1" as the current 192-bit channel status block and the previous 192-bit channel status block are different. Then, the characteristic of the MUX 50 is redefined such that the data output port 54 outputs the current 192-bit channel status when receiving a logic "0" and the previous 192-bit channel status block when receiving a logic "1". The same objective of selectively outputting the current 192-bit channel status block and the previous 192-bit channel status block referring to the comparison result is obtained.

The operation of the validity flag decision unit and the user status decision unit are the same as that described above. The apparatus 100 transmits blocks of data continuously, so once all control words of a block of data (192 frames) have been outputted by the respective multiplexers, the control words will be input to the 192 cycle counter 70. The 192 cycle counter 70 generates a 192-bit index containing the preamble(s), which is utilized for ordering the control words, according to transmission order of the data units. This process of generating a preamble prevents the S/PDIF data from being coupled with a preamble containing noise. The generated bitstream is further combined with the sample words buffered in the FIFO 20.

Finally, the re-combined bitstream is sent to a S/PDIF transmitter (converter) 80, where a parity check is performed. As mentioned earlier, the parity check is used to ensure that the number of '0's and the number of '1's are both even numbers. This is resolved by the parity check bit converting a '0' into a '1', or vice versa, to solve this problem. The S/PDIF data can then be played correctly.

The selective outputting of the current control words or the previous control words ensures that blocks of data corrupted with noise can be discarded. If a current control word differs from a previous control word this indicates that the status of a current block is not good. A preamble coupled with noise can be discarded and a new preamble free from noise can be generated by the utilization of the cycle counter.

It is an advantage of the present invention that noise can be efficiently eliminated from a bitstream of S/PDIF data, by the utilization of the decision units. The comparison of previous control words with current control words and the selective outputting of the current or the previous control words enables a system to play audio data encoded according to a S/PDIF standard without the problem of associated noise.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for generating a bitstream of a first digital interconnect format according to incoming digital data corresponding to a second digital interconnect format, the incoming digital data comprising a previous data unit, a current data unit and a next data unit each having at least a sample word and a control word, the apparatus comprising:

a buffer buffering a previous sample word of the previous data unit, a current sample word of the current data unit and a next sample word of the next data unit in turn;

a decision unit receiving and storing a previous control word of the previous data unit, a current control word of the current data unit and a next control word of the next data unit into a storage unit in turn, and outputting a current selected control word according to the current control word and the previous control word when receiving the current control word and outputting a next selected control word according to the next control word and the current control word when receiving the next control word; wherein the decision unit comprises:

a comparator comparing the current control word of the current data unit with the previous control word of the previous data unit to generate a comparison result;

a multiplexer selectively outputting the previous control word or the current control word according to the comparison result; and a delay circuit delaying the selected output of the previous control word or the current control word by the multiplexer to be inputted as a next previous control word into the multiplexer;

a cycle counter, coupled between the decision unit and a transmitter, generating preambles for the previous, the current and the next data units to enable a current combination and a next combination;

the transmitter, coupled to the decision unit and the buffer, generating the bitstream of the first digital interconnect format according to the current combination of the current sample word and the current selected control word and the next combination of the next sample word and the next selected control word; and wherein the previous control word, the current control word and the next control word are of the same second digital interconnect format.

2. The apparatus of claim 1, wherein the decision unit compares the current control word of the current data unit with the previous control word of the previous data unit and outputs the current selected control word according to a comparison result.

3. The apparatus of claim 2, wherein the first digital interconnect format is a Sony/Philips Digital Interface Format (S/PDIF), the second digital interconnect format is a High Definition Multimedia Interface (HDMI) format, and each of the previous, the current and the next data units is an HDMI frame.

4. The apparatus of claim 1, wherein each of the previous, the current and the next control words includes at least one of a channel status, validity flag and user bit complying with a High Definition Multimedia Interface (HDMI) format.

5. The apparatus of claim 4, wherein each of the previous, the current and the next control words includes a parity bit and the transmitter checks each of the previous, the current and the next data units and determines whether to adjust the parity bit to meet a predetermined parity-checking rule.

6. The apparatus of claim 1, wherein the first digital interconnect format is a Sony/Philips Digital Interface Format (S/PDIF), the second digital interconnect format is a High Definition Multimedia Interface (HDMI) format, and each of the previous, the current and the next data units is an HDMI frame.

7. The apparatus of claim 6, wherein each of the previous, the current and the next control words includes a parity bit, and the transmitter checks each of the previous, the current and the next data units and determines whether to adjust the parity bit to meet a predetermined parity checking rule.

8. The apparatus of claim 1, wherein the decision unit outputs any of the previous and the current control words when they are determined to be the same, outputs the previous control word when it is determined to be different from the current control word, outputs any of the current and the next control words when they are determined to be the same and outputs the current control word when it is determined to be different from the next control word.

9. A method for generating a bitstream of a first digital interconnect format according to incoming digital data corresponding to a second digital interconnect format, the incoming digital data comprising a previous data unit, a current data unit and a next data unit each having at least a sample word and a control word, the method comprising:

buffering by a buffer a previous sample word of the previous data unit, a current sample word of the current data unit and a next sample word of the next data unit in turn;

receiving and storing by a decision unit's storage unit a previous control word of the previous data unit, a current control word of the current data unit and a next control word of the next data unit into the decision unit's storage unit in turn;

comparing by the decision unit's comparator the previous control word of the previous data unit with the current control word of the current data unit to generate a comparison result;

outputting by the decision unit's multiplexer one of the previous control word and the current control word according to the comparison result when receiving the current control word;

delaying by the decision unit's delay circuit the selected output of the previous control word or the current control word by the decision unit's multiplexer to be inputted as a next previous control word into the decision unit's multiplexer;

comparing by the decision unit's comparator the current control word of the current data unit with the next control word of the next data unit to generate a next comparison result;

outputting by the decision unit's multiplexer one of the current control word and the next control word according to the next comparison result when receiving the next control word;

generating by a cycle counter preambles for the previous, the current and the next data units to enable a current combination and a next combination;

generating by the transmitter the bitstream of the first digital interconnect format according to the current combination of the current sample word and one of the previous and the current control words and the next combination of the next sample word and one of the current and the next control words; and wherein the previous control word, the current control word and the next control word are of the same second digital interconnect format.

10. The method of claim 9, wherein the first digital interconnect format is a Sony/Philips Digital Interface Format (S/PDIF), the second digital interconnect format is a High Definition Multimedia Interface (HDMI) format, and each of the previous. the current and the next data units is an HDMI frame.

11. The method of claim 10, wherein each of the previous, the current and the next control words includes at least one of a channel status, validity flag and user bit complying with the HDMI format.

12. The method of claim 9, wherein the method further comprises:

generating the preamble for the current data unit; and outputting one of the previous and the current control words and the preamble for the current data unit according to a transmission order of the current data unit.

13. The method of claim 9, wherein each of the previous. the current and the next control words includes a parity bit, and the method further comprises: checking each of the previous, the current and the next data units and determining whether to adjust the parity bit to meet a predetermined parity checking rule.

14. The method of claim 9, wherein the predetermined rule comprises:
   comparing the previous control word with the current control word to determine whether they are the same;
   outputting any of the previous and the current control words when they are determined to be the same;
   outputting the previous control word when it is determined to be different from the current control word;
   comparing the current control word with the next control word to determine whether they are the same;
   outputting any of the current and the next control words when they are determined to be the same; and
   outputting the current control word when it is determined to be different from the next control word.

15. An apparatus for generating a bitstream of a first digital interconnect format according to incoming digital data corresponding to a second digital interconnect format, the incoming digital data comprising a plurality of data units each having at least a sample word and a control word, the apparatus comprising:
   a buffer buffering sample words of the data units;
   a decision unit receiving control words of the data units, and outputting a selected control word according to a current control word of a current data unit and a previous control word of a previous data unit, the decision unit comprising:
      a comparator comparing the current control word of the current data unit with the previous control word of the previous data unit to generate a comparison result;
      a storage unit, temporarily storing the control words, wherein the temporary storage unit outputs the previous control word to the comparator and then stores the current control word;
      a multiplexer selectively outputting the previous control word or the current control word according to the comparison result; and
      a delay circuit delaying the selected output of the previous control word or the current control word by the multiplexer to be inputted as a next previous control word into the multiplexer;
   a cycle counter. coupled between the decision unit and a transmitter, generating preambles for the data units to enable the generation of the bitstream of the first digital interconnect format;
   the transmitter, coupled to the decision unit and the buffer, generating the bitstream of the first digital interconnect format according to the sample words of the data units and the selected control words outputted from the decision unit; and
   wherein when no previous control word exists in the temporary storage unit, the current control word of the current data unit is directly outputted.

* * * * *